UNITED STATES PATENT OFFICE.

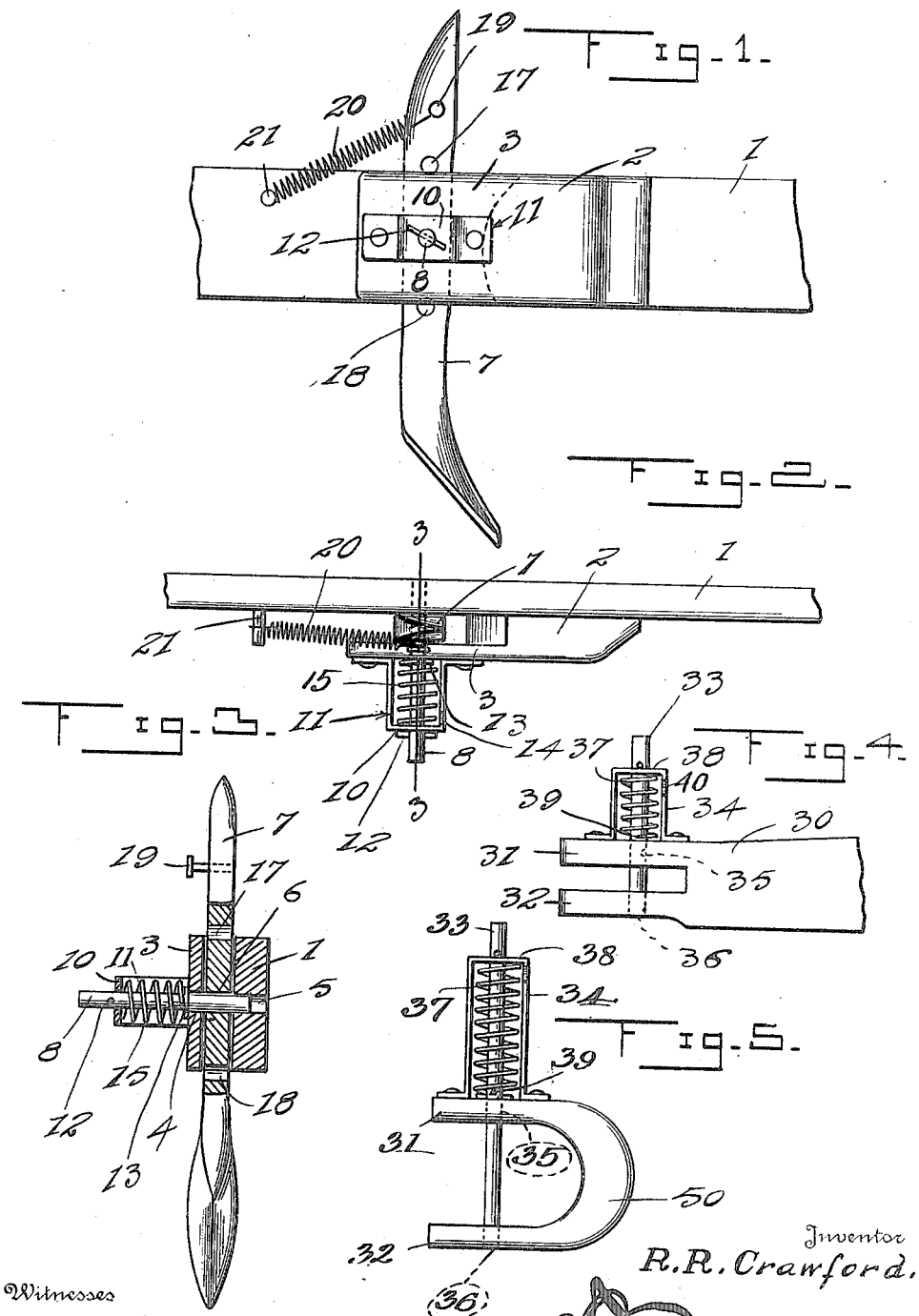

RAYMOND R. CRAWFORD, OF CLIO, LOUISIANA, ASSIGNOR OF ONE-HALF TO JOSEPH WEIDERMAN, OF CLIO, LOUISIANA.

HARROW-TOOTH AND PIVOTAL PIN THEREFOR.

1,207,507.  Specification of Letters Patent.  Patented Dec. 5, 1916.

Application filed May 24, 1915. Serial No. 30,190.

*To all whom it may concern:*

Be it known that I, RAYMOND R. CRAWFORD, a citizen of the United States, residing at Clio, in the parish of Livingston and State of Louisiana, have invented certain new and useful Improvements in Harrow-Teeth and Pivotal Pins Therefor; and I do hereby declare the following to be a full, clear, and exact description of the invention, such as will enable others skilled in the art to which it appertains to make and use the same.

This invention relates to harrow construction, and the primary object of the invention is to provide a pivotally mounted harrow tooth, which has a spring secured thereto for yieldably holding the tooth in a horrowing position for permitting of pivotal movement of the tooth upon engagement with roots, rocks, or other foreign articles which may be embedded in the ground which is being cultivated or prepared for seeding.

Another object of this invention is to provide a novel form of pivot pin for pivotally supporting the harrow tooth, which may also be employed for pivotally connecting various parts of agricultural implements, such as swingletrees to the end of a doubletree, a plow clevis to a doubletree, or the like, which pivot pin embodies a slidably supported pin being spring controlled, and having means associated therewith for limiting the slidable movement of the pin and holding it in an extended position.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of a harrow tooth constructed in accordance with this invention, Fig. 2 is a top plan view of the harrow tooth, Fig. 3 is a sectional view on the line 3—3 of Fig. 2, Fig. 4 is a view showing the application of the pivot pin to a doubletree, and Fig. 5 is a view showing the application of the pivot pin to a plow clevis.

Referring more particularly to the drawings, 1 designates the frame of a harrow, which has a strap 2 secured thereto in any suitable manner. The strap 2 has a plate or arm 3 formed thereon, and extending longitudinally from one end of the block or strap and being spaced from the surface of the harrow frame or tooth carrying bar 1, as is clearly shown in Fig. 2 of the drawings. The frame 1, and the arm or plate 3, are provided with alining openings 5 and 4, which are adapted for alinement with an opening 6 formed in the harrow tooth 7. The openings 4, 5 and 6 receive a pivot pin 8, for pivotally connecting the tooth 7 to the frame 1. The pin 8 is slidably mounted within the openings 4, 5 and 6 and projects through the vertex 10 of a substantially U-shaped guiding bracket 11. The substantially U-shaped guiding bracket 11 is secured to the plate 3, and has its parallel sides positioned upon opposite sides of the pin 8, as is clearly shown in the drawings. The pin 8 has pins 12 and 13 extending diametrically therethrough, which are provided for limiting the slidable movement of the pin. The diametrically disposed pin 12 is positioned for engagement with the outer surface of the connecting arm or vertex of the U-shaped bracket 11, for arresting the inward sliding movement of the pin 8. One of the sides of the bracket 11 is provided with a notch 14, which is adapted for receiving one end of the pin 13, for holding the pin 8 in an extended position against the tension of the spiral spring 15, which is coiled about the pin 8 and engages the inner surface of the vertex 10 and the pin 13, for yieldably holding the pin 8 within the various openings 4, 5 and 6.

The harrow tooth 7 is provided with a pair of transversely extending openings 17 and 18, which are positioned so that a break pin may be inserted therethrough, for engaging the upper edges of the plate 3 of the frame 1 for holding the tooth against pivotal movement, if so desired.

The tooth 7 has a transversely extending pin 19 secured to the end thereof, which extends above the frame 1. A spiral spring 20 has one end secured to the pin 19, and the other end secured to a pin 21, which is carried by the frame 1. The spring 20 yieldably holds the harrow tooth 7 in a substantially vertical position, when the break pins are not employed, and after the tooth 7 has been moved upon its pivotal point, the spring 20 will act for automatically returning the pin to its normal vertical harrowing position.

In Fig. 4 of the drawings, the pivot pin construction is utilized in connection with a doubletree, one end of which is indicated at 30. The doubletree 30 has its end bifurcated for forming arms 31 and 32, which are provided for receiving therebetween, the clevis used for connecting a swingletree to the doubletree. The pin 33, which is identical to the pin 8, is provided for insertion through the eye of the clevis for connecting the clevis to the doubletree, and it is slidably supported by a bracket 34 and alining openings 35 and 36 which are formed in the arms 31 and 32. A spiral spring 37 is coiled about the pin 33 and engages the inner end of the vertex or wrist 38 of the U-shaped bracket 34 and the pin 39 which extends diametrically through the pin 33. The pin 39 is provided for seating in the notch 40 formed in one of the sides of the bracket 34 for holding the pin 33 in extended position for permitting of the insertion of the clevis between the arms 31 and 32.

In Fig. 5 of the drawings, the pin construction is shown as used in connection with a clevis 50, such as is employed in the hitching of double and swingletrees to plows, or like agricultural implements. The pin structure illustrated in Fig. 5 is identical with that illustrated in Figs. 1, 2, 3 and 4, and is provided for connecting the plow clevis to the doubletree clevis, so as to permit of the easy and convenient disconnection of the members when desired.

In reducing the invention to practice, certain minor features of construction, combination, and arrangement of parts may necessitate alteration, to which the patentee is entitled, provided such alterations are comprehended within the scope of what is claimed.

What is claimed is:—

1. In a harrow construction, the combination with a harrow frame, of a block secured to said frame, a plate formed upon and extending outwardly from one end of said block and being spaced from said frame, a harrow tooth positioned between said plate and said frame, a pin extending through said plate, said frame and said harrow tooth, for pivotally connecting the harrow tooth to the frame, and a spiral spring connected to said harrow tooth and said frame for yieldably holding said tooth in a substantially vertical harrowing position.

2. In a harrow construction, the combination with a harrow frame, of a block secured to said frame, a plate formed upon and extending outwardly from one end of said block and being spaced from said frame, a harrow tooth positioned between said plate and said frame, a pin extending through said plate, said frame and said harrow tooth for pivotally connecting the harrow tooth to the frame, a spiral spring connected to said harrow tooth and said frame for yieldingly holding said tooth in a substantially vertical harrowing position, said harrow tooth being provided with a plurality of break pin receiving openings formed therein.

In testimony whereof I affix my signature in presence of two witnesses.

RAYMOND R. CRAWFORD.

Witnesses:
L. W. SHARP,
ALCIDE DUPUY.

Copies of this patent may be obtained for five cents each, by addressing the "Commissioner of Patents. Washington, D C."